United States Patent [19]

Nelson

[11] Patent Number: 5,122,756
[45] Date of Patent: Jun. 16, 1992

[54] LINEARIZATION OF A SENSING BRIDGE CIRCUIT OUTPUT

[75] Inventor: Richard W. Nelson, Freeport, Ill.

[73] Assignee: Honeywell Inc., Minneapolis, Minn.

[21] Appl. No.: 442,205

[22] Filed: Nov. 28, 1989

[51] Int. Cl.$^5$ .................... G01R 27/02; G01F 1/68
[52] U.S. Cl. .................... 324/706; 324/720;
324/725; 73/204.15; 73/204.18
[58] Field of Search .............. 324/705, 706, 720, 725;
73/204.15, 204.11, 204.18

[56] References Cited

U.S. PATENT DOCUMENTS

| | | | |
|---|---|---|---|
| 3,995,481 | 12/1976 | Djorup | 73/204.15 X |
| 4,068,166 | 1/1978 | Pichon | 324/706 |
| 4,229,692 | 10/1980 | Graeme | 324/706 X |
| 4,472,239 | 9/1984 | Johnson et al. | 156/647 |
| 4,478,076 | 10/1984 | Bohrer | 73/204 |
| 4,478,077 | 10/1984 | Bohrer et al. | 73/204 |
| 4,501,144 | 2/1985 | Higashi et al. | 73/204 |
| 4,548,078 | 10/1985 | Bohrer et al. | 73/204 |
| 4,581,928 | 4/1986 | Johnson | 73/204 |
| 4,624,137 | 11/1986 | Johnson et al. | 73/204 |
| 4,651,564 | 3/1987 | Johnson et al. | 73/204 |
| 4,738,657 | 4/1988 | Higashi et al. | 73/204 |
| 4,794,794 | 1/1989 | Djorup | 73/204.15 X |

Primary Examiner—Jack B. Harvey
Attorney, Agent, or Firm—William D. Lanyi

[57] ABSTRACT

The output of a condition sensing bridge is linearized by providing a feedback from the output to the bridge supply which feedback is in the linear form of $V_B = KV_O + V_X$ where $V_B$ is the bridge supply voltage, $K$ is a proportionality constant, $V_O$ is the bridge output and $V_X$ is the feedback offset voltage.

3 Claims, 3 Drawing Sheets

LINEARIZATION OF A SENSING BRIDGE CIRCUIT OUTPUT

BACKGROUND OF THE INVENTION

The present invention relates to apparatus for linearizing the output of a condition sensing bridge circuit and, more particularly, to the linearization of the Honeywell Microbridge Mass Airflow Sensor, forms of which are described in patents such as U.S. Pat. Nos. 4,472,239, 4,478,076, 4,478,077, 4,501,144, 4,548,078, 4,581,928, 4,624,137, 4,651,564 and 4,739,657.

The Honeywell Microbridge Mass Airflow Sensor includes a wheatstone type bridge in which first and second sensing resistors are located in a flow stream on opposite sides of a heater element. The upstream sensor will lose some of its heat into the air stream and the downstream sensor will receive additional heat from the air stream due to the heater element. The temperatures of the sensors and thus their resistances will change with changes in the mass airflow of the stream to unbalance the bridge and the output of the bridge will accordingly be indicative of mass airflow.

A difficulty encountered in the present device is the fact that the output varies in a non-linear fashion with respect to the airflow, and this is undesirable for many applications.

SUMMARY OF THE INVENTION

The present invention provides apparatus for linearizing the output of non-linear sensing bridge circuit and particularly a mass airflow bridge circuit by providing a feedback path from the output to the supply terminal of the bridge circuit so that as the output voltage changes, the supply input voltage also changes in a compensating manner to produce a linear output. While the non-linear output of the bridge circuit could be linearized by designing an amplifier in which the gain increases as the output voltage increases, most amplifier circuits, particularly operational amplifiers, use resistor ratios to set the gain, and a voltage controlled resistance would be required which could be very difficult to implement. Output linearization could also be accomplished by converting the analog signal to digital codes and then digitally processing the signals, but this requires additional components at a significant cost increase.

The present invention overcomes the problem of linearization without undue increased cost and in a simple, straight forward manner. More specifically, when the output of the bridge circuit is amplified to produce a voltage $V_O$, and a portion of $V_O$ is fed back as a supply voltage $V_B$ to the input of the bridge circuit according to a predetermined function $F(V_O)$ in the form of a linear equation $V_B = KV_O + V_X$ where K is a constant of proportionality and $V_X$ is a constant offset voltage, the output $V_O$ may be made quite linear.

A more complete understanding of the present invention will be obtained from the following detailed description when taken in connection with the attached drawings.

DETAILED DESCRIPTION OF THE PREFERRED EMBODIMENTS

Figure 1:
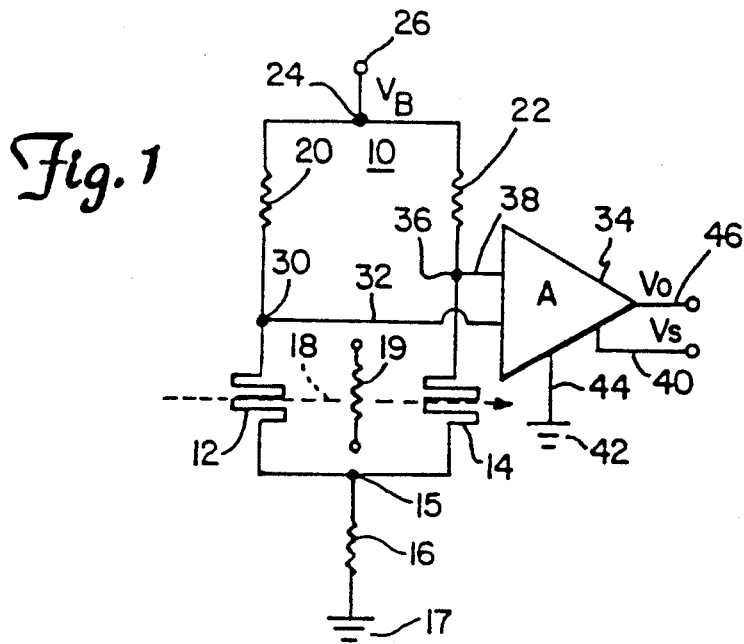
FIG. 1 shows a bridge circuit used in the present Honeywell Microbridge Mass Airflow Sensor.

Referring to FIG. 1, a condition sensing and, more particularly, a mass airflow sensing bridge circuit 10 is shown having first and second thin film heat sensors 12 and 14 respectively, with their lower ends connected to a junction point 15 which, in turn, is connected through a resistor 16 to ground 17. If airflow is assumed to be in the direction shown by dashed line arrow 18, heat sensor 14 is seen to be located on the upstream side of a heater element 19, while heat sensor 12 is located on the downstream side of heater element 19. Heater element 19 is connected to circuitry (not shown) in a manner similar to that shown in the above-referred to patents. Accordingly, as the stream passes over sensor 14, some of the heat in sensor 14 will be dissipated into the stream and its resistance will change as it cools with changes of mass flow of the stream. On the other hand, heater 19 will introduce heat into the stream and sensor 12 will receive some of this heat so that its resistance will change as it heats up with changes in mass airflow. The difference in resistance between sensors 12 and 14 will produce a bridge unbalance which can be measured to produce an indication of the mass flow rate of the stream.

The upper ends of sensors 12 and 14 are connected to the lower ends of resistors 20 and 22, the upper ends of which are connected to a junction point 24 which is, in turn, connected to receive an input voltage $V_B$ at a terminal 26.

The junction between the upper end of sensor 12 and the lower end of resistor 20 is identified as junction point 30 which is connected by a conductor 32 to the lower terminal of an amplifier 34. In similar fashion, the junction between the upper terminal of sensor 14 and the lower terminal of resistor 22 is identified as junction point 36 which is connected to the upper terminal of amplifier 34 by conductor 38. As will be seen in connection with FIG. 3, amplifier 34 actually comprises three operational amplifiers connected so as to respond to the signal between junction points 30 and 36. As the resistances of sensors 12 and 14 change in opposite fashion due to changes in mass air flow, the voltage difference between junction points 30 and 36 changes so that the input to amplifier 34 will be indicative of mass flow rate. Amplifier 34 is connected to a supply voltage source $V_S$ by a conductor 40, and to ground 42 by a conductor 44 and produces an output signal $V_O$ on a conductor 46.

Figure 2:
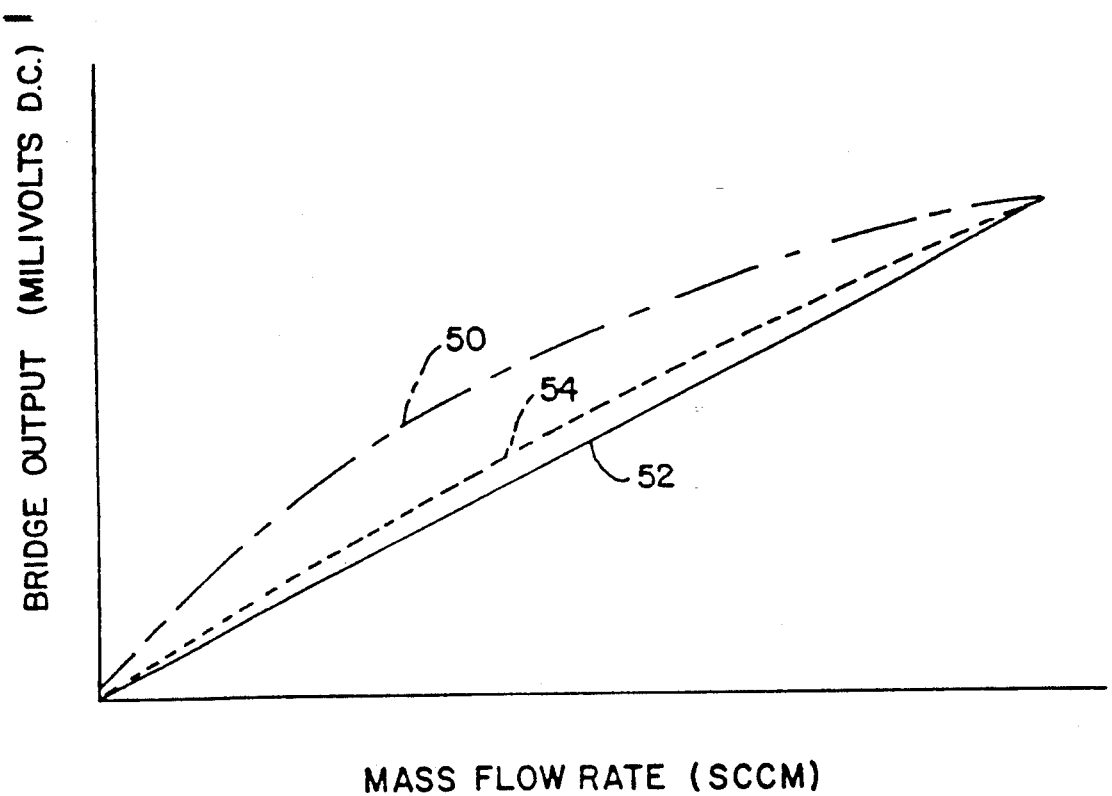
FIG. 2 is a graph showing variations of the unamplified bridge output voltage with mass airflow.

FIG. 2 shows the variation of output voltage from the bridge 10, in millivolts dc, with changes in flow, in standard cubic centimeters per minute (sccm). Dashed line curve 50 shows the variation without use of the present invention and it is seen that this output varies quite nonlinearly. Solid line 52 shows an exactly linear line between the two end points of curve 50 and it is desired that the output voltage of the system vary with flow rate as close as possible to line 52. Dashed line curve 54 shows the approximate output voltage obtained by use of the present invention, and it is seen that curve 54 is very close to linear, as is desired.

In considering the present invention, several conditions should be kept in mind. First, the input voltage to the bridge cannot be too low or the bridge will lose too much sensitivity. The sensors are most sensitive with the highest input voltage $V_B$ (about 10 volts when the supply is 10 volts) and they become less sensitive as $V_B$ decreases. In the preferred embodiments, it is desired that the voltage $V_B$ not fall below about 4 volts. Second, the output voltage $V_O$ should stay somewhat below the supply voltage, i.e. about 10 volts which is the voltage used in the present Honeywell system. Third, the customers for mass air flow sensors have different applications in mind and while ordinarily, a 4 volt variation in $V_O$ from the lowest (usually 0 standard cubic centimeters per minute or sccm) to the highest mass airflow being sensed (say 200 sccm) is satisfactory, some may prefer to have a different range and even with a 4 volt range, some may prefer to have the variation occur between, say, 4 volts and 8 volts while others may prefer the variation to be between, say, 1 volt and 5 volts. Accordingly, the various parameters of the system have to be constrained to meet these requirements.

Figure 3:
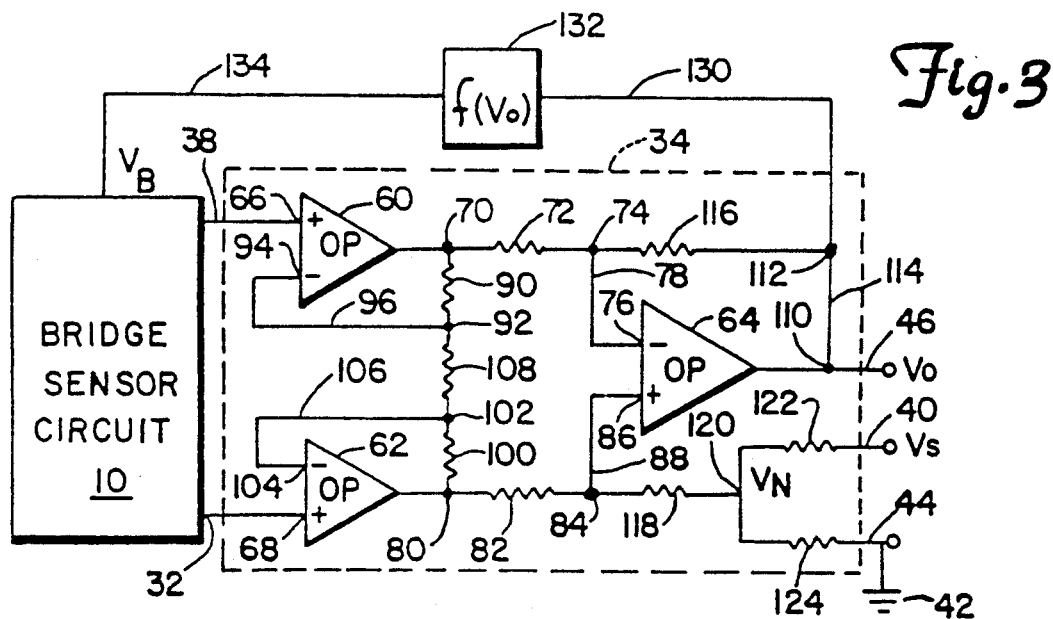
FIG. 3 is a generalized circuit diagram of the present invention.

FIG. 3 shows the basic concept used in connection with the present invention. In FIG. 3, the bridge sensor circuit 10 is shown as a box having output conductors 32 and 38 as was the case in FIG. 1. Amplifier 34 is shown in dashed lines and is seen to comprise a series of three operational amplifiers 60, 62 and 64. Operational amplifiers 60, 62 and 64 may be part of a single quad amplifier integrated circuit package sold as a unit (for example the LM124 sold by the National Semiconductor Company) and since a fourth amplifier is used for the heater control amplifier (not shown), a considerable cost saving is obtained compared to the purchase of individual operational amplifiers.

Output terminal 38 of bridge sensor circuit 10 is connected to the positive input terminal 66 of operational amplifier 60, and output terminal 32 of bridge circuit 10 is connected to the positive input terminal 68 of operational amplifier 62. The output of operational amplifier 60 is connected to a junction point 70 and through a resistor 72 to a junction point 74 which is connected to the negative input terminal 76 of operational amplifier 64 by a conductor 78. The output of operational amplifier 62 is connected to a junction point 80 and through a resistor 82 to a junction point 84 connected to the positive input terminal 86 of operational amplifier 64 by a conductor 88. Junction point 70 is also connected through a resistor 90 to a junction point 92 which is connected to the negative input 94 of operational amplifier 60 by a conductor 96. Junction point 80 is connected through a resistor 100 to a junction point 102 which is connected to the negative input terminal 104 of operational amplifier 62 by a conductor 106. Junction points 92 and 102 are connected through a resistor 108. The output of operational amplifier 64 is connected to a junction point 110 which is connected by the conductor 46 to provide the output voltage $V_O$ as in FIG. 1. Conductor 46 is also connected to a junction point 112 by a conductor 114 and junction point 112 is connected through a resistor 116 to junction point 74.

Junction point 84 is also connected through a resistor 118 to a junction point 120 which is between a resistor 122 and a resistor 124. Resistors 122 and 124 are connected between conductors 40 and 44 of FIG. 1 and are thus between the voltage $V_S$ and ground 42. Junction point 120 is therefore placed at a voltage $V_N$ which is the null or set point voltage, the magnitude of which is dependent upon the size of resistors 122 and 124 and which may be adjusted for purposes to be explained hereinafter.

Junction point 112, which is seen to be at the output voltage $V_O$, is shown in FIG. 3 to be connected by a conductor 130 to a function box 132 which operates on the voltage $V_O$ to produce a function thereof identified as $f(V_O)$. The output of function box 132 is a modified voltage which appears on a conductor 134 connected to the upper terminal of bridge sensor circuit 10 FIG. 1 to supply the bridge input voltage $V_B$.

In order that the output voltage be linear, I use a linear transfer function $f(V_O)$ which, as mentioned above, is in the form: $V_B = KV_O + V_X$, where K is a constant of proportionality and $V_X$ is the offset constant for the function. This transfer may be obtained using an operational amplifier in the feedback loop as is shown in FIG. 4.

Figure 4:
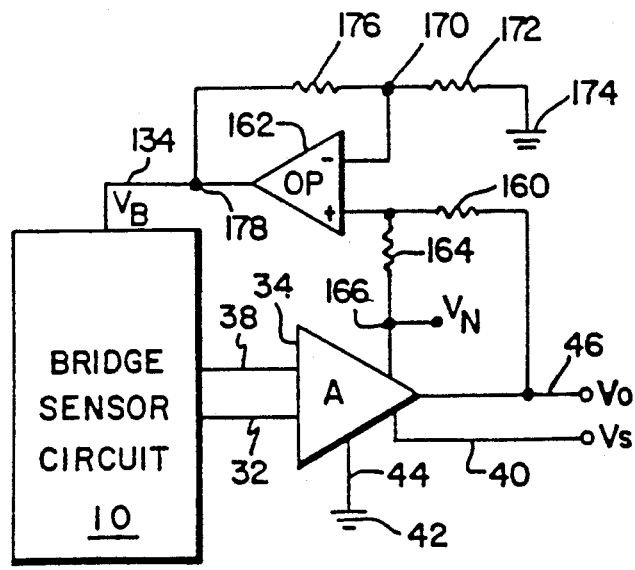
FIG. 4 is one preferred embodiment of the present invention.

In FIG. 4, the sensing bridge circuit 10 is shown with the output conductors 32 and 38 connected to amplifier 34, it being remembered that amplifier 34 in its preferred form, has the three operational amplifiers therein as shown in FIG. 3. Amplifier 34 again is shown producing an output $V_O$ on a conductor 46, has an input voltage $V_S$ on conductor 40 and a ground connection 42 on conductor 44. The output $V_O$ on conductor 46 is connected through a resistor 160 to the positive input terminal of an operational amplifier 162 and through a resistor 164 to a conductor 166 shown to be at the voltage $V_N$ so as to indicate that conductor 166 may be connected to junction point 120 in FIG. 3 to supply $V_N$ the operational amplifier 64.

The negative terminal of operational amplifier 162 is connected to a junction point 170 and through a resistor 172 to a ground connection 174. Junction point 170 is connected through a resistor 176 to a junction point 178 which is connected to operational amplifier 162 output and which is connected by conductor 134 to supply the $V_B$ input to sensing bridge circuit 10.

Considering FIGS. 1, 2, 3 and 4, and the following definitions: "S" is the output voltage of the bridge 10 when $V_B$ is held at a predetermined supply voltage "$V_{BX}$" and the mass flow changes across sensing resistors 12 and 14 to produce a curve such as 50 in FIG. 2; $V_N$ is a voltage representing the desired output voltage when there is zero mass flow, i.e. when $S=0$ and "A" is the gain of amplifier 34 i.e. the total gain of operational amplifiers 60, 62 and 64, then the system equation for FIG. 4 can be shown to be:

$$V_0 = \frac{\frac{S}{V_{BX}} AV_X + V_N}{1 - \frac{S}{V_{BX}} AK} \qquad (1)$$

Note that the only variables in equation (1) are S and $V_O$ with the others being settable constants which can be determined for specific uses as will be shown below.

Without compensation, the variation in the output S of bridge 10 and the output $V_O$ in FIG. 1 were measured using a 10 volt supply voltage $V_B$ and the mass flow rate across sensors 12 and 14 of FIG. 1 was allowed to vary from 0 sccm to 200 sccm and the following values were obtained for S:

| Mass Flow Rate (sccm) | S (millivolts) | $V_O$ (volts) |
|---|---|---|
| 0 | 0 | 1.00 |
| 20 | 7.31 | 2.28 |
| 40 | 14.33 | 3.51 |
| 60 | 20.05 | 4.51 |
| 80 | 24.77 | 5.33 |
| 100 | 28.85 | 6.05 |
| 120 | 32.39 | 6.67 |
| 140 | 35.44 | 7.20 |
| 160 | 38.08 | 7.66 |
| 180 | 40.37 | 8.06 |
| 200 | 42.37 | 8.41 |

In order to determine what values K and $V_X$ have, two values of S may then be chosen from the chart above and equation (1) set up twice with these values and the corresponding values for $V_O$. The resulting two equations may then be solved as simultaneous equations. For example, with the above conditions where at zero mass flow rate the output voltage is 1 volt, and at 200 sccm it is 8.00 volts, then $V_N = 1$ volt and with $S_1$ at, for example 40 sccm mass flow rate, is 14.33 millivolts and $S_2$ at, for example 200 sccm is 42.37 millivolts, then K can be shown to be 0.689 and $V_X$ to be volts. Equation 1 can then be solved for the linearized values of S and $V_O$ under those specific conditions.

Under other conditions, and remembering the constraints relating to the minimum value of the input voltage $V_B$, the maximum size of output voltage $V_O$ and the desired output variations of the customers, the parameters of Equation (1) may be varied to obtain the desired values while still linearizing the output curve. As another example, if the customer wishes to have a varying output voltage of between 1 volt and 5 volts, then the voltage $V_N$ is 1 volt but the end $V_O$ is now 5 volts, not 8 volts. Under these circumstances, K and $V_X$ are calculated. Using equation (1) the following chart comparing mass flow rate and output voltage is obtained:

| Flow (sccm) | $V_O$ volts |
|---|---|
| 0 | 1.00 |
| 20 | 1.40 |
| 40 | 1.79 |
| 60 | 2.19 |
| 80 | 2.59 |
| 100 | 2.98 |
| 120 | 3.39 |
| 140 | 3.79 |
| 160 | 4.20 |
| 180 | 4.60 |
| 200 | 5.02 |

Figure 6:
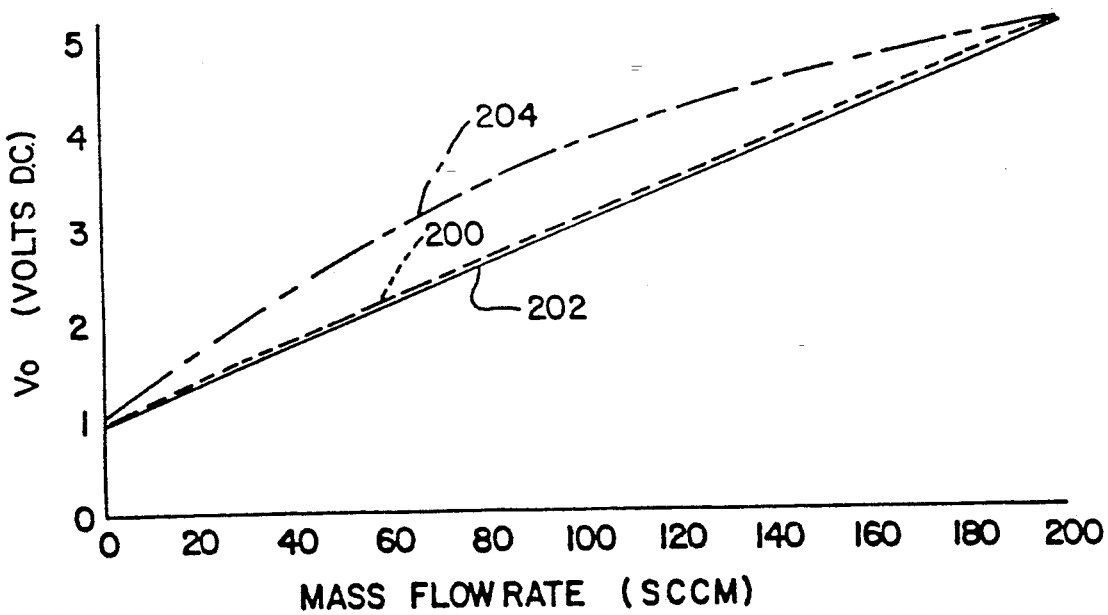
FIG. 6 is a graph showing variations of amplified output voltage $V_O$ with mass airflow for the circuitry of FIG. 4 when used for one specific requirement of the present invention.

The graph for this chart is seen in FIG. 6 as dashed line curve 200 and is seen to be quite close to the straight line shown as solid line 202 and much more linear then an uncompensated output shown by dashed dot line curve 204. more linear then an uncompensated output shown by dashed dot line curve 204.

The circuit of FIG. 4 has one disadvantage in that because of the additional amplifier 162, a single quad amplifier cannot be used and an additional operational amplifier must be employed. In some cases, this problem can be over come as seen below.

If a customer desires to have an output voltage which varies between 4 volts and 8 volts, then the operational amplifier 162 of FIG. 4 and the associated resistors can be eliminated. In other words, the linear function $f(V_O)$ can be a short circuit between $V_O$ and $V_B$ because the condition that $V_B$ remain above 4 volts is met without the operational amplifier. This has the additional advantage that only one quad amplifier need be employed for a cost saving.

Figure 5:
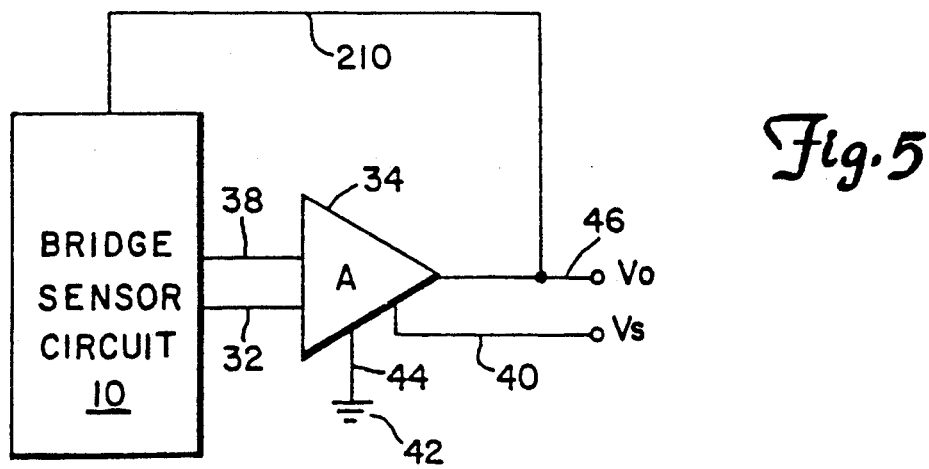
FIG. 5 is a second preferred embodiment of the present invention.

The short circuit version of FIG. 3 is seen in FIG. 5 wherein the bridge sensor circuit 10 and amplifier 34 are arranged as in FIG. 1 and 3 but with a conductor 210 connected between the output conductor 46 and the bridge input to supply the voltage $V_B$. Because now $V_B = V_O$, $K = 1$ and $V_X = 0$, equation (1) becomes:

$$V_0 = \frac{V_N}{1 - (S/V_B X)A} \quad (2)$$

With this equation, when the mass flow is zero, $V_N$ is 4 volts. If it is assumed that at the high end, i.e. $V_O = 8$ volts, and that S will have the same high end value it had in the previous example, i.e. 42.37 millivolts, then the gain A of amplifier 34 is calculated to be 118. Actually, the gain of amplifier 34 is dependent upon the gains of the operational amplifier configurations in FIG. 3.

Using the above values for the equation (2), the chart for the output voltage vs. mass flow rate is:

| Mass Flow Rate (sccm) | $V_O$ (volts) |
|---|---|
| 0 | 4.00 |
| 20 | 4.378 |
| 40 | 4.814 |
| 60 | 5.240 |
| 80 | 5.652 |
| 100 | 6.065 |
| 120 | 6.475 |
| 140 | 6.875 |
| 160 | 7.264 |
| 180 | 7.639 |
| 200 | 8.000 |

Figure 7:
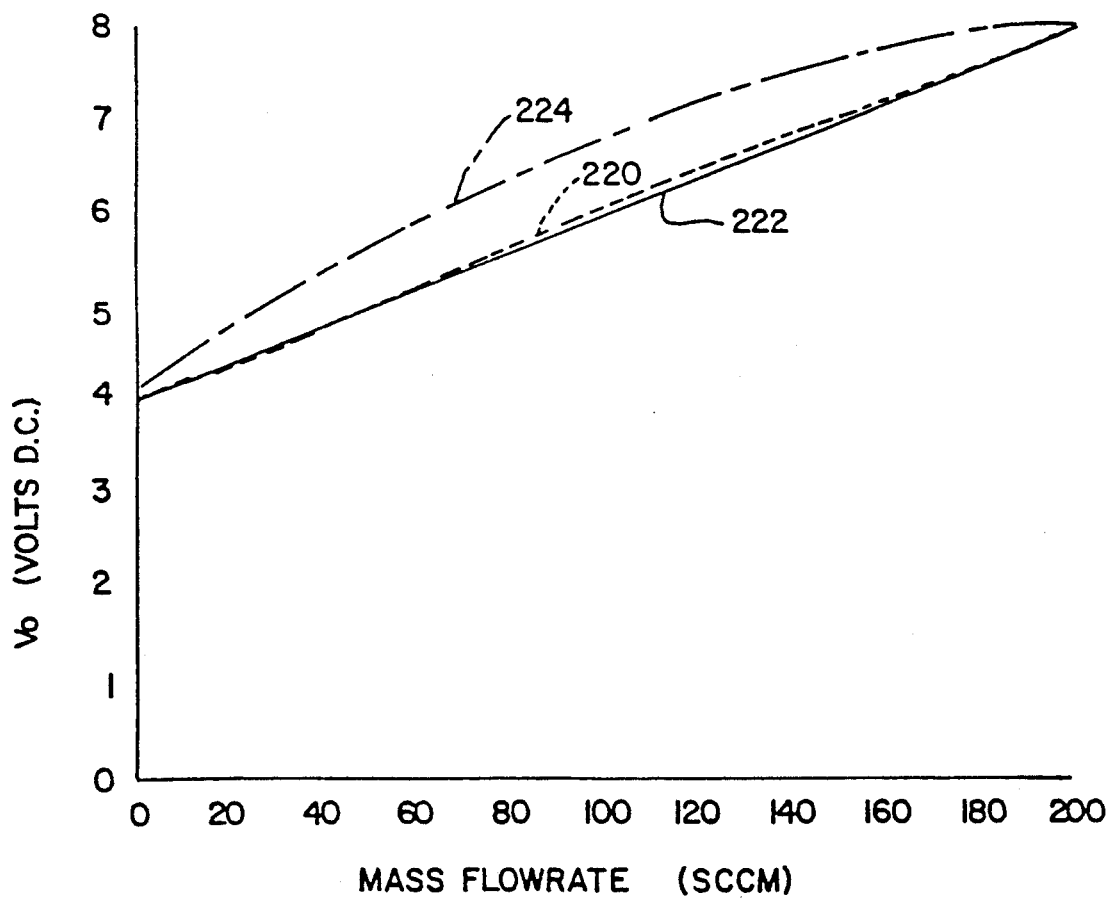
FIG. 7 is a graph showing variations of output voltage with mass airflow for the circuitry of FIG. 5 when used for another specific requirement of the present invention.

The graph for this chart is seen in FIG. 7 as dashed line curve 220 and again it is seen that it is nearly as linear as straight line curve 222 and much more linear that the uncompensated curve shown by dashed dot line 224.

It is therefore seen that I have provided a linearization for the output of a previously non-linear bridge by providing a feedback path from the output to the input of the bridge circuit and so characterized that the resultant output becomes linear between desired limits.

Although the present invention has been described with reference to preferred embodiments, workers skilled in the art will recognize that changes may be made in form and detail without departing from the spirit and scope of the invention.

What is claimed is:

1. A linearization circuit for a mass air flow sensor, comprising:
   an upstream thermally sensitive resistor;
   a heat source;
   a downstream thermally sensitive resistor, said heat source being disposed between said upstream and downstream thermally sensitive resistors;
   a first reference resistor connected electrically in series with said upstream resistor between a first circuit point and a ground potential to form a first current path;

a second reference resistor connected electrically in series with said downstream resistor between said first circuit point and said ground potential to form a second current path, said first and second current paths being connected in electrically parallel association;

an amplifier having first and second inputs, said first input being connected in electrical communication with a first junction between said first reference resistor and said upstream thermally sensitive resistor, said second input being connected in electrical communication with a second junction between said second reference resistor and said downstream thermally sensitive resistor, said amplifier having an output;

means for adding an offset voltage to an amplification of a voltage difference between said first and second junctions to provide an amplified and offset signal at said output of said amplifier; and means for connecting said output of said amplifier in electrical communication with said first circuit point, said output of said amplifier being generally linear.

2. The circuit of claim 1, wherein:
said connecting means comprises an operational amplifier.

3. The circuit of claim 1, wherein:
said connecting means comprises a means for modifying said output of said amplifier and providing said modified output as an input to said first circuit point.

* * * * *